US009338652B1

(12) United States Patent
Allen et al.

(10) Patent No.: US 9,338,652 B1
(45) Date of Patent: May 10, 2016

(54) DYNAMIC PASSWORD-LESS USER VERIFICATION (71) Applicant: International Business Machines Corporation

(72) Inventors: Corville O. Allen, Morrisville, NC (US); Ramakrishna Boggarapu, Cary, NC (US); Ravi K. Muthukrishnan, Durham, NC (US); Nataraj Nagaratnam, Cary, NC (US); Sherk L. Walker, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

(21) Appl. No.: 14/541,097

(22) Filed: Nov. 13, 2014

(51) Int. Cl.
*H04M 1/68* (2006.01)
*H04W 12/06* (2009.01)

(52) U.S. Cl.
CPC ..................................... *H04W 12/06* (2013.01)

(58) Field of Classification Search
CPC ......................................................... H04M 1/66
See application file for complete search history.

(56) References Cited

U.S. PATENT DOCUMENTS

| 8,401,522 B2 * | 3/2013 | Crawford ................ G06F 21/31 455/410 |
| 8,407,465 B2 | 3/2013 | Naaman et al. |
| 2003/0083040 A1 * | 5/2003 | Ruth ...................... H04W 24/08 455/405 |
| 2012/0324558 A1 | 12/2012 | Pollock |
| 2013/0159732 A1 | 6/2013 | Leoutsarakos |
| 2013/0183935 A1 | 7/2013 | Holostov et al. |

FOREIGN PATENT DOCUMENTS

| EP | 0978983 B1 | 9/2004 |
| WO | 02102025 A1 | 12/2002 |
| WO | 2010011594 A1 | 1/2010 |
| WO | 2012156785 A1 | 11/2012 |

OTHER PUBLICATIONS

Rabin et al., Mobile Web Best Practices 1.0, W3C Recommendation Jul. 29, 2008, http://www.w3.org/TR/mobile-bp/#d0e1925.
Sahu, Call Logs Backup & Restore, Sep. 17, 2014, https://play.google.com/store/apps/details?id=com.riteshsahu.CallLogBackupRestore&hl=en.
AT&T, http://developer.att.com/developer/basicTemplate.jsp?passedItemId=12500043.

* cited by examiner

*Primary Examiner* — Kwasi Karikari
*Assistant Examiner* — Randy Peaches
(74) *Attorney, Agent, or Firm* — Garg Law Firm, PLLC; Rakesh Garg; William J. Stock (57) ABSTRACT

A method, system, and computer program product for dynamic password-less user verification in a mobile device are provided in the illustrative embodiments. Using a processor and a memory in the mobile device, a first portion of a call log stored in the mobile device is selected. Using a transformation function, a first transformed value corresponding to the first portion is obtained. A second portion of a call log stored in a repository of a service provider is obtained from the service provider, the service provider facilitating voice communications from the mobile device, and the second portion corresponding to the first portion. Using the transformation function, a second transformed value corresponding to the second portion is obtained. Responsive to the first transformed value matching the second transformed value within a tolerance limit, a conclusion is generated that the user verification is successful.

20 Claims, 5 Drawing Sheets

DYNAMIC PASSWORD-LESS USER VERIFICATION

TECHNICAL FIELD

The present invention relates generally to a method, system, and computer program product for identifying a user of a data processing system. More particularly, the present invention relates to a method, system, and computer program product for dynamic password-less user verification on mobile devices.

BACKGROUND

Many interactions between a user and a mobile device require a user to input some type of identifying information. For example, interactions with a website or an application via the mobile device often prompt the user to provide a login identifier and a password. As another example, some interactions prompt the user to provide additional identifying information, such as an address or a parent's maiden name.

Some websites and applications write verification code and data called a cookie (cookies) on the data processing system used by a user to interact with those websites or applications. The information stored in the cookies is used as and when user verification is needed during the interactions.

SUMMARY

The illustrative embodiments provide a method, system, and computer program product for dynamic password-less user verification. An embodiment includes a method for user verification in a mobile device. The embodiment selects, using a processor and a memory in the mobile device, a first portion of a call log stored in the mobile device. The embodiment obtains, using a transformation function, a first transformed value corresponding to the first portion. The embodiment obtains, from a service provider, a second portion of a call log stored in a repository of the service provider, the service provider facilitating voice communications from the mobile device, and the second portion corresponding to the first portion. The embodiment obtains, using the transformation function, a second transformed value corresponding to the second portion. The embodiment concludes, responsive to the first transformed value matching the second transformed value within a tolerance limit, that the user verification is successful.

Another embodiment includes a computer usable program product comprising a computer readable storage device including computer usable code for user verification in a mobile device. The embodiment further includes computer usable code for selecting, using a processor and a memory in the mobile device, a first portion of a call log stored in the mobile device. The embodiment further includes computer usable code for obtaining, using a transformation function, a first transformed value corresponding to the first portion. The embodiment further includes computer usable code for obtaining, from a service provider, a second portion of a call log stored in a repository of the service provider, the service provider facilitating voice communications from the mobile device, and the second portion corresponding to the first portion. The embodiment further includes computer usable code for obtaining, using the transformation function, a second transformed value corresponding to the second portion. The embodiment further includes computer usable code for concluding, responsive to the first transformed value matching the second transformed value within a tolerance limit, that the user verification is successful.

Another embodiment includes a mobile device for user verification. The embodiment further includes a storage device including a storage medium, wherein the storage device stores computer usable program code. The embodiment further includes a processor, wherein the processor executes the computer usable program code. The embodiment further includes computer usable code for selecting, using the processor and the storage device in the mobile device, a first portion of a call log stored in the mobile device. The embodiment further includes computer usable code for obtaining, using a transformation function, a first transformed value corresponding to the first portion. The embodiment further includes computer usable code for obtaining, from a service provider, a second portion of a call log stored in a repository of the service provider, the service provider facilitating voice communications from the mobile device, and the second portion corresponding to the first portion. The embodiment further includes computer usable code for obtaining, using the transformation function, a second transformed value corresponding to the second portion. The embodiment further includes computer usable code for concluding, responsive to the first transformed value matching the second transformed value within a tolerance limit, that the user verification is successful.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Within the scope of the illustrative embodiments, a mobile device is any portable data processing system, which can be used for voice communications. As one example, a smartphone is a mobile device because the smartphone includes voice communication capabilities, via a phone service provider. A tablet computer, a wearable computing device, or another similarly purposed device is another example of a mobile device if such device can be used for making one or more of voice over internet protocol (VoIP) calls via a VoIP service provider, audio and/or video conferencing via a conferencing service provider, and voice phone calls via a phone service provider. Any provider of voice communication services of any type, on a mobile device of any suitable type, is collectively referred to herein as a service provider.

The illustrative embodiments recognize that presently available methods for user verification on mobile devices require active user participation, which can be undesirable in user experience considerations. For example, cookies are frequently used to carry out session management, to identify users and to store user preferences.

The illustrative embodiments recognize that on many mobile devices, the implementation of cookies mechanism is either absent, incomplete, proprietary, or otherwise limited in some respect. Such implementations of cookies, or lack thereof, make it difficult for content providers to provide user-identity dependent custom content, such as targeted advertising, storing user preferences, session histories, and the like. Accordingly, even if a content provider, e.g., a website server or an application, can write cookies to avoid repeated verification prompts to the user on other data processing systems, the content provider is forced to depend on user prompting and user inputs for user verification.

The illustrative embodiments recognize that inputting user verification information on a mobile device is often cumbersome due to the small size or virtual keyboards usually employed on mobile devices. When the verification information has to be entered to begin or continue a communication with a content provider, the user is likely to experience frustration with the content provider resulting in poor user experience.

For example, assume that a user visits a popular online retailer's website, performs a search for televisions under appropriate section, and finds several items that match the user's criteria. The user decides to do more research on the top five matches before buying a television from the retailer and leaves the retailer's website. When the user returns later and reopens his browser to visit the retailer's website again, the user is generally not able to track the list of televisions already reviewed and shortlisted previously and must go through the entire selection and shortlisting process again to filter the top five items he had previously selected.

To further highlight the problem, if the user would like to add his chosen list of top five items to a wish list so that the list will be stored as a user preference, the user generally has to login with his username and password. The user must do this sequence of operations every time the user visits the retailer's website and searches for different items.

The illustrative embodiments recognize that requiring the user to login just to verify the user, to store user's preferences, and perform other session related tasks is an unnecessary burden on the user at least because the user is not yet ready to buy those items, and results in poor user experience for the user.

Some other implementations attempt to avoid user inputs for verification by using other static information from the mobile device. For example, some user verification methods for mobile devices use the mobile device's phone number or identifier (e.g., the device's IMEI code), as a stand-in for the user's identity. The illustrative embodiments recognize that such device-specific static information is unsuitable for secure user verification because such information can be obtained with trivial effort and can be easily spoofed resulting in a compromise of the user's information. Furthermore, such static information often requires pre-registration with content providers and is easily predict or hacked, resulting in weak authentication that is not suitable for a variety of interactions.

The illustrative embodiments recognize that this and other similar problems manifest themselves in numerous e-commerce systems due to weak implementation of cookies in mobile devices. The illustrative embodiments recognize that a better solution would store the user's history and preferences so that they can be stored and retrieved transparently without requiring user inputs and without compromising the user's identity.

The illustrative embodiments used to describe the invention generally address and solve the above-described problems and other problems related to user verification on mobile devices. The illustrative embodiments provide a method, system, and computer program product for dynamic passwordless user verification on mobile devices.

A mobile device according to an embodiment maintains a log of the voice calls made from the mobile device. The call log can be a log of voice calls over a conventional phone service, VoIP calls over a data network, audio/video conferencing calls over a data network, or a combination thereof. Within the scope of the illustrative embodiments, a single call log can hold mixed records of different types of calls, more than one different call logs can hold the records of same or different types of calls, or a combination thereof.

For example, in one embodiment, a single call log holds the call records of all conventional phone calls made and received using the mobile device. In another example embodiment, one call log holds the call records of all conventional phone calls made using the mobile device and another call log holds the call records of all conventional phone calls received using the mobile device. In another example embodiment, one call log holds the call records of all conventional phone calls and VoIP calls made and received using the mobile device. Any combination of call records can be stored in any number of call logs within the scope of the illustrative embodiments.

An embodiment detects a communication between a content provider application and an application executing on the mobile device, such as from a web server on a remote system to a browser on the mobile device. The embodiment further detects that the communication needs, or is requesting some user verification information, e.g., a username, a password, a secondary verification information in a multi-part verification method.

The embodiment selects a portion of a call log available on the mobile device. The embodiment obtains a hash value of the portion of the call log.

The embodiment requests a corresponding portion of the call logs maintained by the service provider. For example, the portion of the call log from the mobile device and the portion of the call log from the service provider cover the same time period and include records of calls made or received using the mobile device during that time period.

The embodiment obtains a hash value of the service provider provided corresponding portion of the service provider's call log. The embodiment uses the same hash function to obtain the two hash values.

The embodiment compares the two hash values. When the two hash values match, the embodiment sends a notification of successful user verification to the content provider application. In one embodiment, the match between the two hash values need not be a perfect match, and the two hash values are deemed to match if they match within a specified tolerance for variations.

One embodiment sends to the content provider application only that information as is sufficient to indicate successful user verification at the mobile device. Another embodiment sends to the content provider application that information as is sufficient to indicate successful user verification at the mobile device as well as some identifying information about the mobile device, e.g., a phone number or an IMEI code.

Another embodiment encrypts the one or more components of the information sent to the content provider application.

One embodiment obtains the two hash values by performing both the hash computations at a client-side application in the mobile device. According to the embodiment, the client-side application receives the portion of the mobile device's call log and the service provider's portion of the service provider's call log at the client-side application. The client-side application computes and compares the two has values according to a hash function available at the client-side application. Based on the result of the comparison, the client-side application then sends the information about the success or failure of the user verification to the content provider.

Another embodiment causes a client-side application on the mobile device to obtain the two hash values from a server-based application. According to the embodiment, the client-side application sends the portion of the mobile device's call log to the server-based application. The server-based application requests the service provider's portion of the call log and receives the service provider's portion of the call log at the server-based application. The server-based application computes and compares the two has values according to a hash function available at the server-based application. The server-based application sends a result of the comparison to the client-side application. The client-side application then sends the information about the success or failure of the user verification to the content provider.

An embodiment is usable as a substitute for cookies in certain implementations. Another embodiment is usable as one part of a multi-part user verification process.

An embodiment can be used in conjunction with user-provided username and password. For example, one embodiment detects and intercepts user verification requests for storing and retrieving the user's session information but allows prompting the user for login information when the user is engaged in a purchase transaction.

The illustrative embodiments are described with respect to certain types of mobile devices, communications, transactions, requests, user verification information and components thereof, encryption, hash computation, log and records therein, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
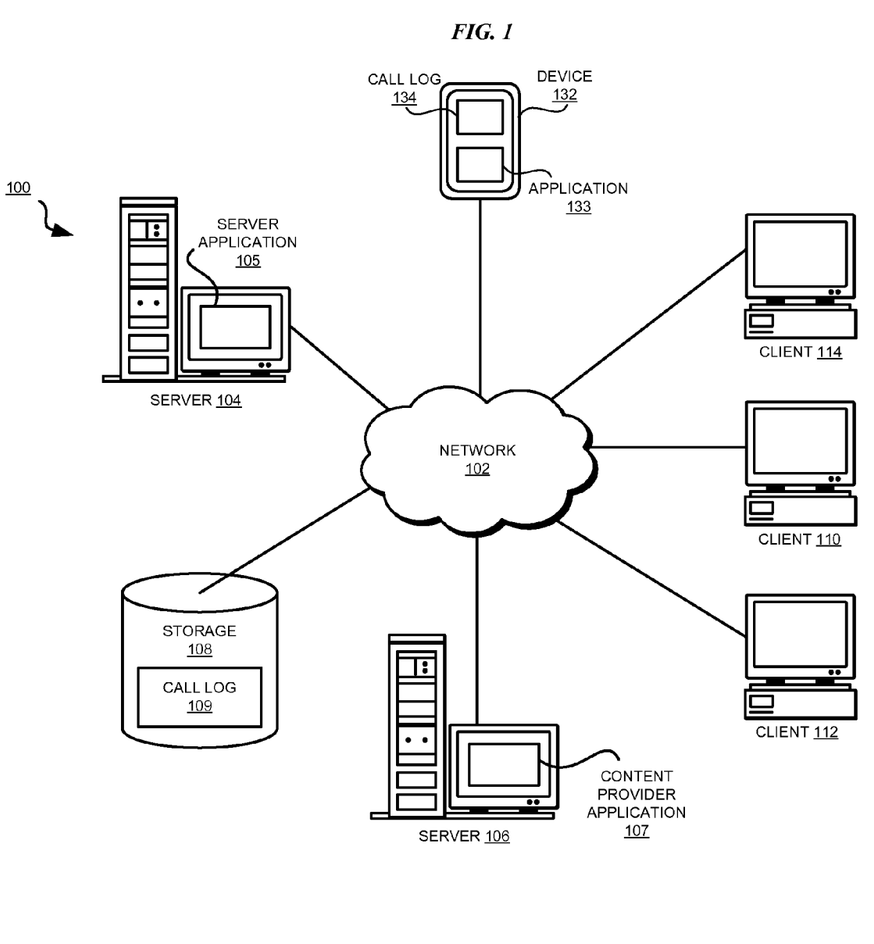
FIG. 1 depicts a block diagram of a network of data processing systems in which illustrative embodiments may be implemented.
Figure 2:
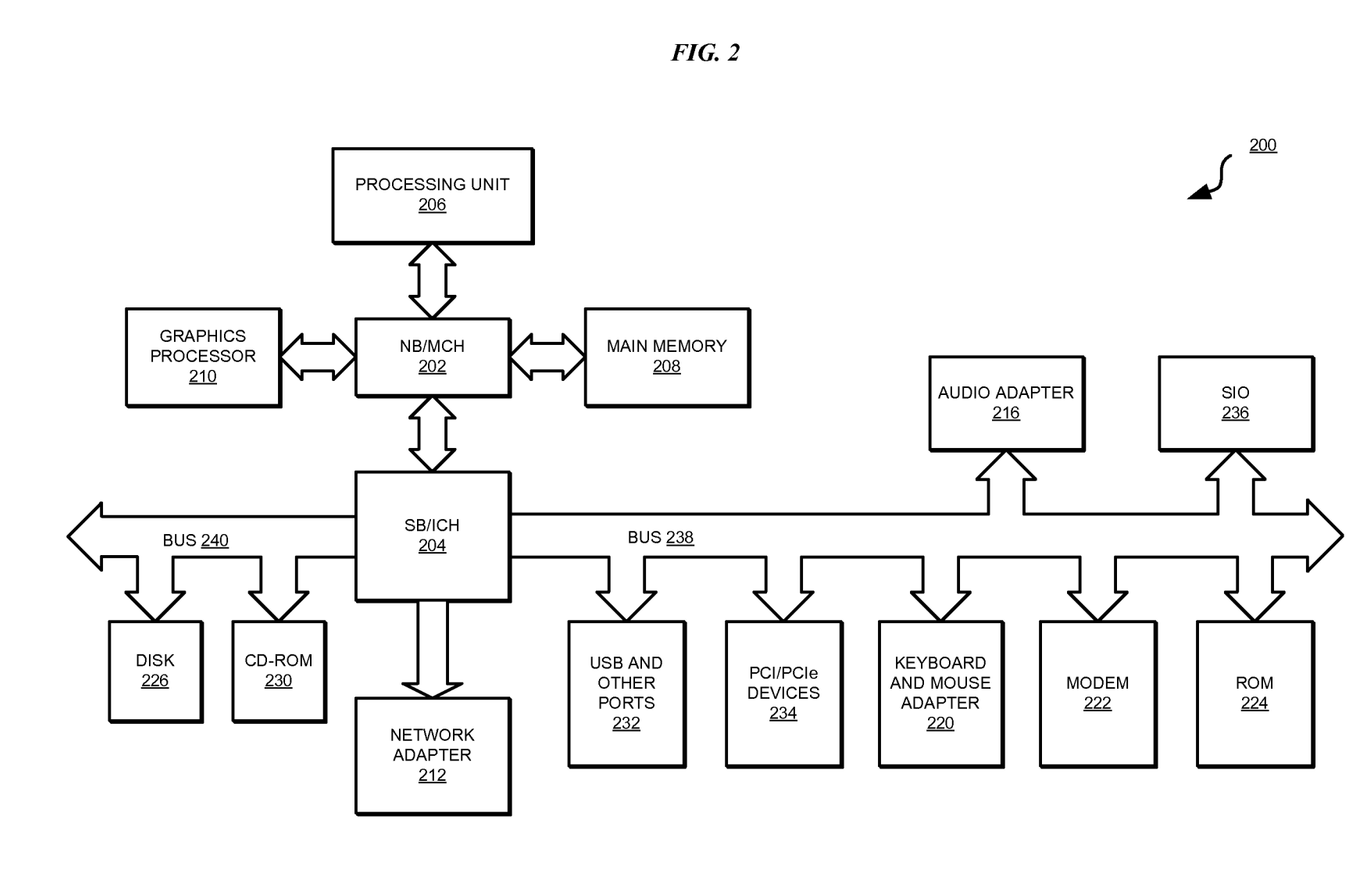
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Device 132 is a mobile device. Application 133 is an example of a client-side application and implements an embodiment described herein. Call log 134 comprises one or more logs of voice calls of one or more types, received, sent, or both. Content provider application 107 in server 106 is an example content provider application that sends content and user verification requests to applications, such as a browser or apps in device 132. Server application 105 in server 104 is an example of a server-side application and implements an embodiment described herein. Call log 109 comprises a service provider's call log according to the illustrative embodiments.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of a device, such as device 132 in FIG. 1 in which computer usable program code or instructions implementing the processes of the illustrative embodiments may be located. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as server application 105, content provider application 107, or application 133 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
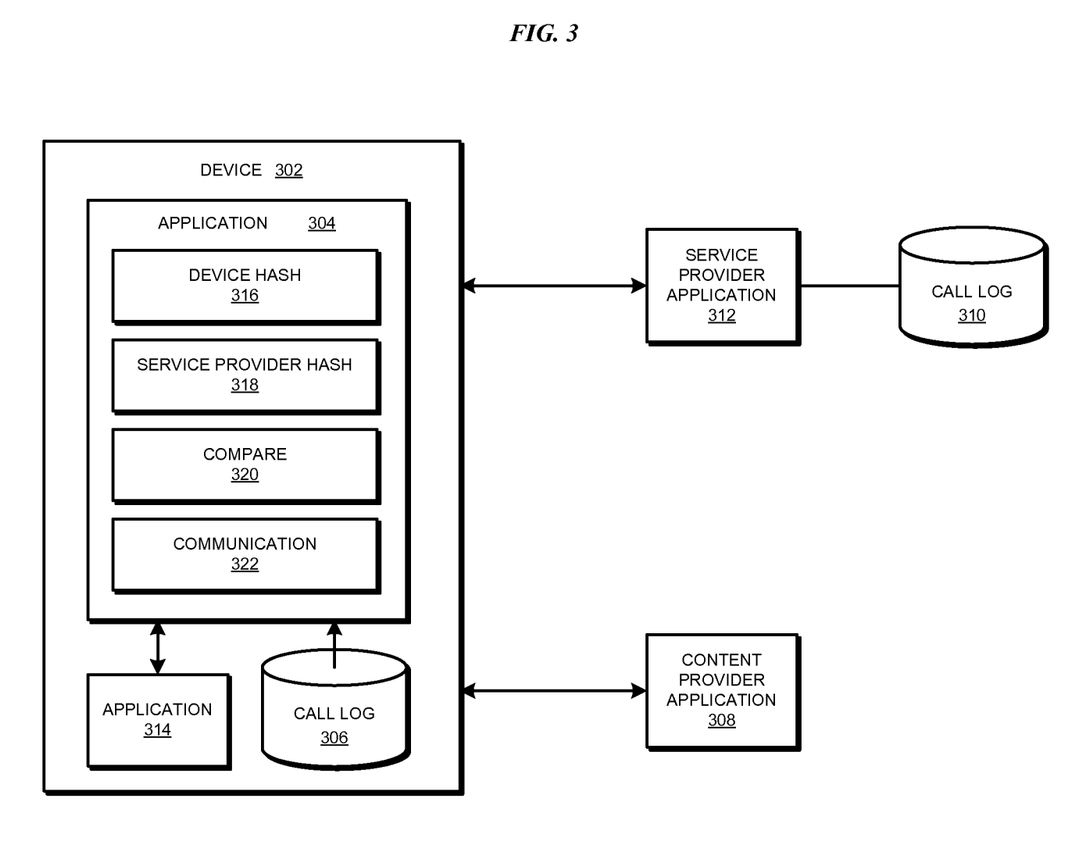
FIG. 3 depicts a block diagram of an example configuration for dynamic password-less user verification in accordance with an illustrative embodiment.

With reference to FIG. 3, this figure depicts a block diagram of an example configuration for dynamic password-less user verification in accordance with an illustrative embodiment. Device 302 is an example of device 132 in FIG. 1. Application 304 is an example of application 133 in FIG. 1. Call log 306 is maintained by mobile device 302 and is an example of call log 134 in FIG. 1. Content provider application 308 is an example of content provider application 107 in FIG. 1.

Generally, the embodiments are described with the understanding that a suitable security mechanism is employed at device 132, service provider application 312, or both, such that the password-less user verification features of an embodiment are reasonably protected from hacking or malicious use. For example, prior to or during performing an operation of an embodiment described herein, application 304 or another application may perform some verification and/or authentication of the user, the device, an identifier associated with the user or the device, a biometric feature or other feature of the user, a circumstantial parameter of the device, a subscription of the user with a service provider, an account attribute associated with such subscription, or a combination of these and other similarly usable factors.

Call log 310 is an example of service provider's call log 109 in FIG. 1. Call log 310 can include log records of multiple devices and subscribers, including call records of calls made or received using mobile device 302 or a subscriber associated therewith. Service provider application 312 is any suitable application at a service provider to receive and fulfill requests from an embodiment for all or portions of call log 310 that pertain to mobile device 302 or a subscriber associated with mobile device 302.

Application 314 may be any suitable application executing in mobile device 302 and communicating with content provider application 308. For example, application 314 may be a browser, receiving content or interacting in a transaction with content provider application 308.

Application 304 implements an embodiment described herein and detects a request for user verification from content provider application 308 sent to application 314. Component 316 obtains a portion of one or more call logs in call log 306 (device portion of call log 306). A portion of a log comprises all or some part of the log. Component 316 hashes the device portion of call log 306 using a hash function (not shown) available in application 304. Component 316 produces a device-side hash value as a result of hashing the device portion of call log 306.

Component 318 sends a request to service provider application 312 for all or a portion those one or more call logs from call log 310 which contain call records of calls to and from mobile device 302 or a subscriber associated with mobile device 302 (service provider portion of call log 310). Component 318 receives from service provider application 312 the service provider portion of call log 310. Component 318 hashes the service provider portion of call log 310 using the same hash function as used by component 316 for hashing the device portion of call log 306. Component 318 produces a service provider-side hash value as a result of hashing the service provider portion of call log 310.

Component 320 compares the device-side hash value with the service provider-side hash value. If the two hash values match exactly or within a specified tolerance limit, component 320 outputs information indicative of successful user verification. If the two hash values do not match exactly or the difference between the two hash values exceeds the specified tolerance limit, component 320 outputs information indicative of a failed user verification. In one embodiment, component 320 encrypts the information indicative of successful user verification and any additional information, such as a number or identifier associated with mobile device 302.

Component 322 facilitates communications with content provider application 308, service provider application 312, or both. For example, in one embodiment, component 318 uses component 320 to send the request to service provider application 312 for service provider portion of call log 310. Component 318 receives the service provider portion of call log 310 from service provider application 312 using component 320.

In another embodiment, component 320 uses component 322 to send the information indicative of successful user verification to content provider application 308. Any additional information, such as a number or identifier associated with mobile device 302 is also a part of such communication from component 320 to content provider application 308.

Figure 4:
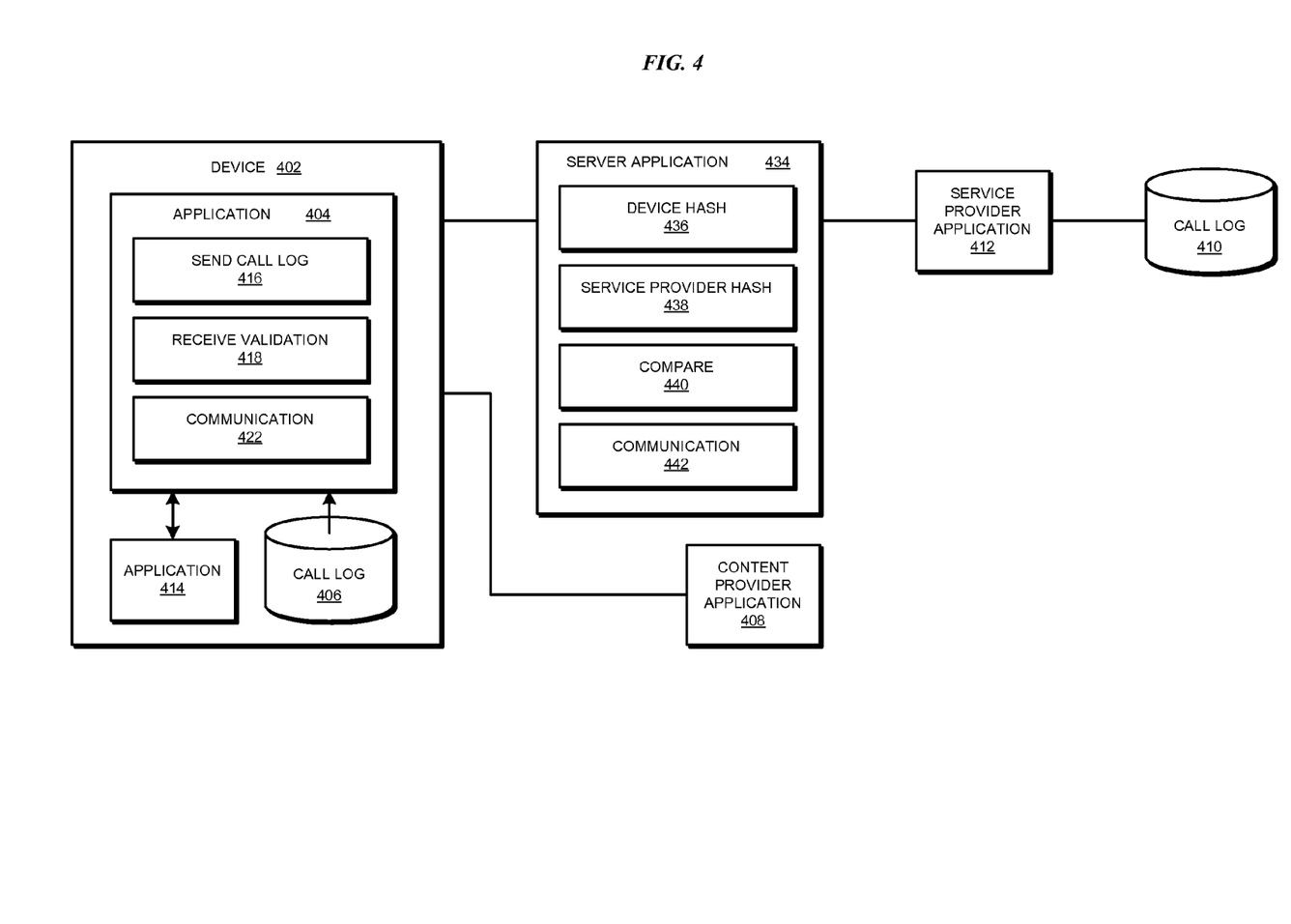
FIG. 4 depicts a block diagram of another example configuration for dynamic password-less user verification in accordance with an illustrative embodiment.

With reference to FIG. 4, this figure depicts a block diagram of another example configuration for dynamic password-less user verification in accordance with an illustrative embodiment. Device 402 is an example of device 302 in FIG. 3. Application 404 is a different example of application 133 in FIG. 1. Call log 406 is maintained by mobile device 402 and is an example of call log 306 in FIG. 3. Content provider application 408 is an example of content provider application 308 in FIG. 3.

Call log 410 is an example of service provider's call log 310 in FIG. 3. Service provider application 412 is an example of service provider application 312 in FIG. 3.

Application 414 is an example of application 314 in FIG. 3. Server application 434 is an example of server application 105 in FIG. 1. Server application 434 implements an embodiment directed to one or more functions of a server-side application as described herein. Application 404 implements an embodiment directed to one or more functions of a client-side application described herein.

Application 404 detects a request for user verification from content provider application 408 sent to application 414. Component 416 obtains all or a portion of one or more call logs in call log 406 (device portion of call log 406). Component 416 sends the device portion of call log 406 to server application 434, e.g., using communication component 422. Communication component 422 operates in a manner similar to component 322 in FIG. 3.

Component 436 in server application 434 performs a hash function (not shown) available in application 434 on the device portion of call log 406. Component 436 produces a device-side hash value as a result of hashing the device portion of call log 406.

Component 438 sends a request to service provider application 412 for all or a portion those one or more call logs from call log 410 which contain call records of calls to and from mobile device 402 or a subscriber associated with mobile device 402 (service provider portion of call log 410). Component 418 receives from service provider application 412 the service provider portion of call log 410. Component 438 hashes the service provider portion of call log 410 using the same hash function as used by component 436 for hashing the device portion of call log 406. Component 438 produces a service provider-side hash value as a result of hashing the service provider portion of call log 410.

Component 440 compares the device-side hash value with the service provider-side hash value. If the two hash values match exactly or within a specified tolerance limit, component 440 outputs information indicative of successful user verification. If the two hash values do not match exactly or the difference between the two hash values exceeds the specified tolerance limit, component 440 outputs information indicative of a failed user verification.

Component 418 in application 404 receives the information indicative of success or failure of user verification from component 440, such as via a communication link between communication component 422 in application 404 and communication component 442 in server application 434. In one embodiment, component 418 encrypts the information received from component 440. In an embodiment, component 418 further adds additional information to the information received from component 440. As an example, such additional information includes but is not limited to a number or identifier associated with mobile device 402.

Component 422 facilitates communications with content provider application 408, server application 434, or both. Component 442 facilitates communications with service provider application 412, application 404, or both. For example, in one embodiment, component 438 uses component 442 to send the request to service provider application 412 for service provider portion of call log 410. Component 438 receives the service provider portion of call log 410 from service provider application 412 using component 442. In another embodiment, component 418 uses component 422 to send the information indicative of successful user verification to content provider application 408.

Figure 5:
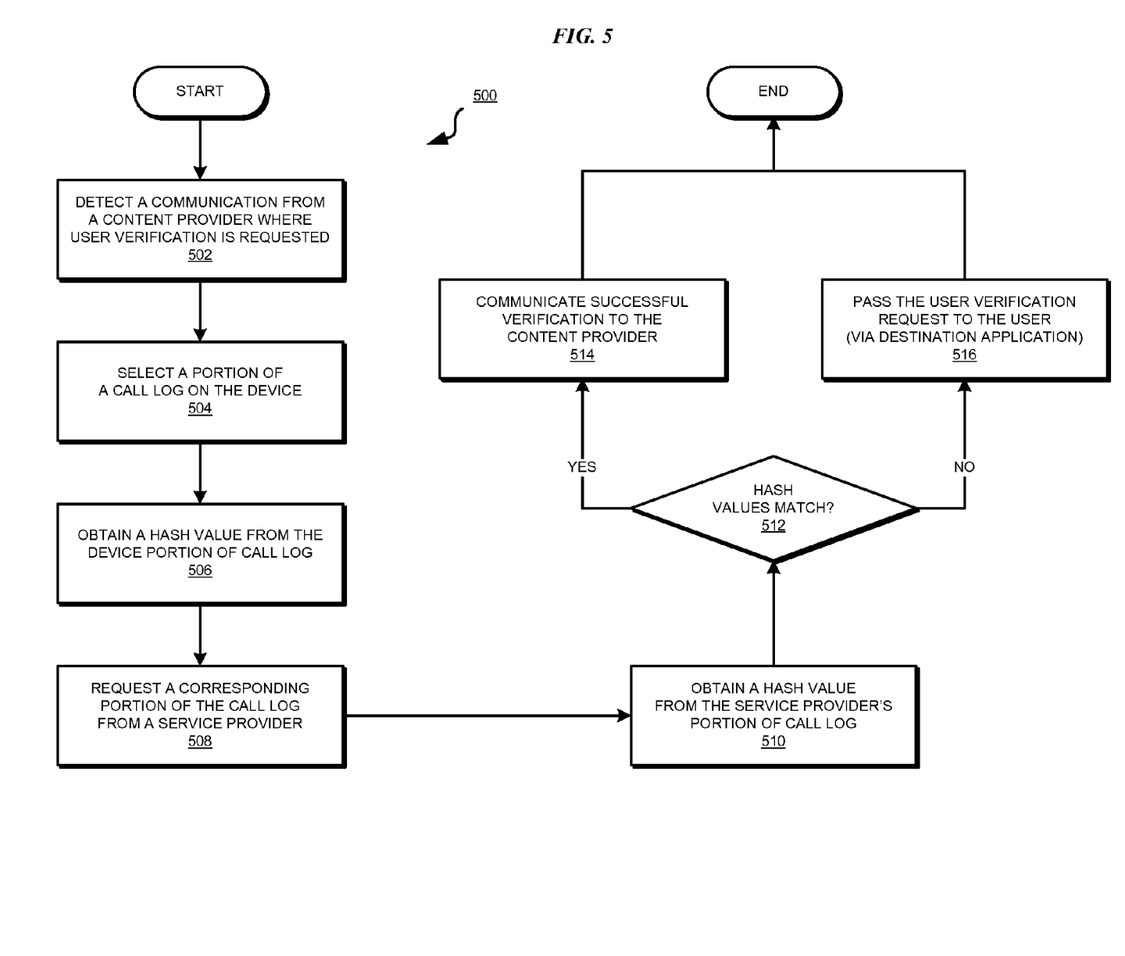
FIG. 5 depicts a flowchart of an example process for dynamic password-less user verification in accordance with an illustrative embodiment.

With reference to FIG. 5, this figure depicts a flowchart of an example process for dynamic password-less user verification in accordance with an illustrative embodiment. Process 500 can be implemented in application 304 in FIG. 3, or in a combination of application 404 and server application 434 in FIG. 4. Only as an example and without implying any limitations thereto, the following description of process 500 assumes the implementation in the form of application 304 in FIG. 3. Those of ordinary skill in the art will be able to modify process 500 to perform the modified process using a combination of applications 404 and 434 in FIG. 4. Such a modified process is contemplated within the scope of the illustrative embodiments.

The application detects a communication from a content provider where the communication includes a request for user verification (block 502). For example, application 304 or application 404 perform the detection of block 502 in different embodiments.

The application selects a portion of a call log on the mobile device (block 504). For example, application 304 selects the device portion of call log 306 in one embodiment, and application 404 selects the device portion of call log 406 in another embodiment.

The application obtains a hash value from the device portion of the call log (block 506). For example, in one embodiment, component 316 of application 304 generates the hash value obtained in block 506. In another embodiment, component 436 of server application 434 generates the hash value obtained in block 506.

The application requests a corresponding portion of the call log from a service provider (block 508). For example, in one embodiment, component 318 of application 304 requests the service provider portion of call log 310 in block 508. In another embodiment, component 438 of server application 434 requests the service provider portion of call log 410 in block 508.

The application obtains a hash value from the service provider portion of the call log (block 510). For example, in one embodiment, component 318 of application 304 generates the hash value obtained in block 510. In another embodiment, component 438 of server application 434 generates the hash value obtained in block 510.

The application determines whether the two hash values from block 506 and 510 match within a tolerance limit (block 512). For example, in one embodiment, component 320 of application 304 performs the comparison in block 512. In another embodiment, component 440 of server application 434 generates the hash value obtained in block 512.

If the application determines that the two hash values from block 506 and 510 match within a tolerance limit ("Yes" path of block 512), the application communicates successful user verification to the content provider (block 514). The application ends process 500 thereafter. For example, in one embodiment, component 320 of application 304 forms a suitable message with information about the successful user verification and communicates to content provider application 308 using component 322, in executing block 514. In another embodiment, component 418 of application 404 forms a suitable message with information about the successful user verification and communicates to content provider application 408 using component 422, in executing block 514.

If the application determines that the two hash values from block 506 and 510 do not match within a tolerance limit ("No" path of block 512), the application passes the user verification request received in block 502 to the user or a destination application in the mobile device (block 516). The application ends process 500 thereafter. For example, in one embodiment, application 304 passes the user verification request to application 314, in executing block 516. In another embodiment, application 404 passes the user verification request to application 414, in executing block 516.

Thus, a computer implemented method, system or apparatus, and computer program product are provided in the illustrative embodiments for dynamic password-less user verification in a mobile device. The user verification performed by an embodiment is dynamic because the verification technique depends upon call logs that change over time, to wit, are dynamic. The hash values computed at one time are unlikely to be valid when computed using changed portions of the call logs at a second time. Furthermore, as is evident from the description of the various embodiments, the user need not provide any input, including but not limited to a password, for successful verification according to an embodiment. Therefore, the user verification of an embodiment comprises a password-less manner of user verification.

Additionally, while hashing, hash functions, and hash values are used to describe the various embodiments, those of ordinary skill in the art will be able to adapt an embodiment to use other transformations and transformation functions in a similar manner. Such adaptations are contemplated within the scope of the illustrative embodiments. For example, a log entry can be transformed into a regular expression and compared with a regular expression of another log entry within the scope of the illustrative embodiments. As another example, a log entry can be transformed into a seed or seed value for a cryptographic algorithm to produce an output, the other log entry can similarly be transformed into a seed or seed value for the cryptographic algorithm to produce another output, and the two outputs can be compared within the scope of the illustrative embodiments.

An embodiment selects a portion of a call log on a mobile device, and requests a corresponding portion of the log from a service provider. Any suitable way to identify the corresponding section, such as a starting call identifier, a starting time-stamp, and similarly purposed other indicators, or a combination thereof, is usable to request the corresponding portion from the service provider.

Furthermore, the portion of the log on the device and the portion received from the service-provider need not match perfectly. An embodiment is adaptable to conclude that the portions match if the portions match beyond a threshold degree of match. The matching operation can be adapted to account for expected or unexpected variations in the logs, such that portions of the logs from the device and the service provider are deemed to match even if they vary from one another but match beyond the threshold degree of match.

An embodiment can be adapted to further include a normalization operation. Using the normalization operation, the adapted embodiment normalizes to a common format one or more portions of the logs obtained from one or more sources, including the device, to remove formatting based variations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for user verification in a mobile device, the method comprising:
    selecting, using a processor and a memory in the mobile device, a first portion of a call log stored in the mobile device;
    obtaining, using a transformation function, a first transformed value corresponding to the first portion;
    obtaining, from a service provider, a second portion of a call log stored in a repository of the service provider, the service provider facilitating voice communications from the mobile device, and the second portion corresponding to the first portion;
    obtaining, using the transformation function, a second transformed value corresponding to the second portion; and
    concluding, responsive to the first transformed value matching the second transformed value within a tolerance limit, that the user verification is successful.

2. The method of claim 1, wherein the obtaining the first transformed value and obtaining the second transformed value is each performed using the processor and the memory in the mobile device.

3. The method of claim 1, wherein the obtaining the first transformed value and obtaining the second transformed value is each performed using a processor and a memory in a data processing system distinct from the mobile device.

4. The method of claim 1, further comprising:
    detecting, in the mobile device, in a communication from a content provider application, a request for the user verification; and
    communicating to the content provider application, responsive to the concluding, information corresponding to the successful user verification.

5. The method of claim 4, further comprising:
    communicating to the content provider application, responsive to the concluding, identifying information corresponding to the mobile device, wherein the information corresponding to the successful user verification and the identifying information corresponding to the mobile device are encrypted.

6. The method of claim 1, further comprising:
    comparing the first transformed value and the second transformed value, wherein the comparing occurs in the mobile device.

7. The method of claim 1, wherein the first portion and the second portion each includes records over a same time period.

8. The method of claim 1, wherein the call log stored in the mobile device comprises a plurality of records of voice calls performed using the mobile device, and wherein the voice calls are performed using different voice communication service providers, the service provider being one of the different voice communication service providers.

9. The method of claim 1, wherein the call log stored in the mobile device comprises a plurality of call logs, each distinct call log in the plurality of call logs comprising records of voice calls performed using the mobile device and a corresponding distinct voice communication service provider, the service provider being one distinct voice communication service provider.

10. The method of claim 1, further comprising:
    selecting, using the processor and the memory in the mobile device, a third portion of the call log stored in the mobile device;
    obtaining, using a second transformation function, a third transformed value corresponding to the third portion;
    obtaining, from the service provider, a fourth portion of the call log stored in the repository of the service provider, the fourth portion corresponding to the third portion;
    obtaining, using the second transformation function, a fourth transformed value corresponding to the fourth portion; and
    concluding, responsive to the third transformed value not matching the fourth transformed value within the tolerance limit, that the user verification is unsuccessful.

11. The method of claim 10, further comprising:
    detecting, in the mobile device, in a communication from a content provider application, to a second application executing in the mobile device, a request for the user verification; and
    forwarding to the second application, responsive to the concluding that the user verification is unsuccessful, the request for the user verification.

12. A computer usable program product comprising a computer readable storage device including computer usable code for user verification in a mobile device, the computer usable code comprising:
    computer usable code for selecting, using a processor and a memory in the mobile device, a first portion of a call log stored in the mobile device;
    computer usable code for obtaining, using a transformation function, a first transformed value corresponding to the first portion;
    computer usable code for obtaining, from a service provider, a second portion of a call log stored in a repository of the service provider, the service provider facilitating voice communications from the mobile device, and the second portion corresponding to the first portion;
    computer usable code for obtaining, using the transformation function, a second transformed value corresponding to the second portion; and
    computer usable code for concluding, responsive to the first transformed value matching the second transformed value within a tolerance limit, that the user verification is successful.

13. The computer usable program product of claim 12, wherein the computer usable code for obtaining the first transformed value and the computer usable code for obtaining the second transformed value is each performed using the processor and the memory in the mobile device.

14. The computer usable program product of claim 12, wherein the computer usable code for obtaining the first transformed value and the computer usable code for obtaining the second transformed value is each performed using a processor and a memory in a data processing system distinct from the mobile device.

15. The computer usable program product of claim 12, further comprising:
    computer usable code for detecting, in the mobile device, in a communication from a content provider application, a request for the user verification; and computer usable code for communicating to the content provider application, responsive to the concluding, information corresponding to the successful user verification.

16. The computer usable program product of claim 15, further comprising:
computer usable code for communicating to the content provider application, responsive to the concluding, identifying information corresponding to the mobile device, wherein the information corresponding to the successful user verification and the identifying information corresponding to the mobile device are encrypted.

17. The computer usable program product of claim 12, further comprising:
computer usable code for comparing the first transformed value and the second transformed value, wherein the comparing occurs in the mobile device.

18. The computer usable program product of claim 12, wherein the computer usable code is stored in a computer readable storage medium in a data processing system, and wherein the computer usable code is transferred over a network from a remote data processing system.

19. The computer usable program product of claim 12, wherein the computer usable code is stored in a computer readable storage medium in a server data processing system, and wherein the computer usable code is downloaded over a network to a remote data processing system for use in a computer readable storage medium associated with the remote data processing system.

20. A mobile device for user verification, the mobile device comprising:
a storage device including a storage medium, wherein the storage device stores computer usable program code; and
a processor, wherein the processor executes the computer usable program code, and wherein the computer usable program code comprises:
computer usable code for selecting, using the processor and the storage device in the mobile device, a first portion of a call log stored in the mobile device;
computer usable code for obtaining, using a transformation function, a first transformed value corresponding to the first portion;
computer usable code for obtaining, from a service provider, a second portion of a call log stored in a repository of the service provider, the service provider facilitating voice communications from the mobile device, and the second portion corresponding to the first portion;
computer usable code for obtaining, using the transformation function, a second transformed value corresponding to the second portion; and
computer usable code for concluding, responsive to the first transformed value matching the second transformed value within a tolerance limit, that the user verification is successful.

* * * * *